United States Patent
Wilson

(10) Patent No.: US 7,216,218 B2
(45) Date of Patent: *May 8, 2007

(54) MICROPROCESSOR WITH HIGH SPEED MEMORY INTEGRATED IN LOAD/STORE UNIT TO EFFICIENTLY PERFORM SCATTER AND GATHER OPERATIONS

(75) Inventor: Sophie Wilson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 10/857,843

(22) Filed: Jun. 2, 2004

(65) Prior Publication Data

US 2005/0273576 A1    Dec. 8, 2005

(51) Int. Cl.
G06F 15/80    (2006.01)
(52) U.S. Cl. .................. 712/226; 712/22; 712/210; 712/27; 712/4; 711/217; 711/117
(58) Field of Classification Search .............. 712/4, 712/226, 22, 210, 27; 711/217, 218, 117, 711/118, 131, 149, 133
See application file for complete search history.

(56) References Cited

U.S. PATENT DOCUMENTS

| | | | |
|---|---|---|---|
| 5,887,183 A | | 3/1999 | Agarwal et al. |
| 5,895,501 A | * | 4/1999 | Smith ..................... 711/207 |
| 5,940,876 A | | 8/1999 | Pickett |
| 6,530,012 B1 | | 3/2003 | Wilson |
| 6,553,486 B1 | * | 4/2003 | Ansari ..................... 712/222 |
| 2003/0074530 A1 | * | 4/2003 | Mahalingaiah et al. ..... 711/117 |
| 2003/0074544 A1 | * | 4/2003 | Wilson ..................... 712/226 |
| 2003/0159023 A1 | | 8/2003 | Barlow et al. |
| 2004/0250090 A1 | | 12/2004 | Crispin et al. |
| 2005/0273577 A1 | * | 12/2005 | Wilson et al. ............. 711/217 |
| 2005/0273582 A1 | | 12/2005 | Wilson |

OTHER PUBLICATIONS

"Advanced Computer Architectures"; Sima et al; 1997; Addison-Wesley; p. 89-95, 175-179.

* cited by examiner

Primary Examiner—Hong Kim
(74) Attorney, Agent, or Firm—Stern, Kessler, Goldstein & Fox P.L.L.C.

(57) ABSTRACT

The present invention relates to the field of (micro)computer design and architecture, and in particular to microarchitecture associated with moving data values between a (micro) processor and memory components. Particularly, the present invention relates to a computer system with an processor architecture in which register addresses are generated with more than one execution channel controlled by one central processing unit with at least one load/store unit for loading and storing data objects, and at least one cache memory associated to the processor holding data objects accessed by the processor, wherein said processor's load/store unit contains a high speed memory directly interfacing said load/store unit to the cache and directly accessible by the cache memory for implementing scatter and gather operations. The present invention improves the performance of architectures with dual ported microprocessor implementations comprising two execution pipelines capable of two load/store data transactions per cycle. By including a high speed memory inside the load/store unit, the processor is directly interfaced from its load/store units to the caches and efficiency gains are achieved by reusing the data information already present in the high speed memory structure of the load/store unit.

12 Claims, 2 Drawing Sheets

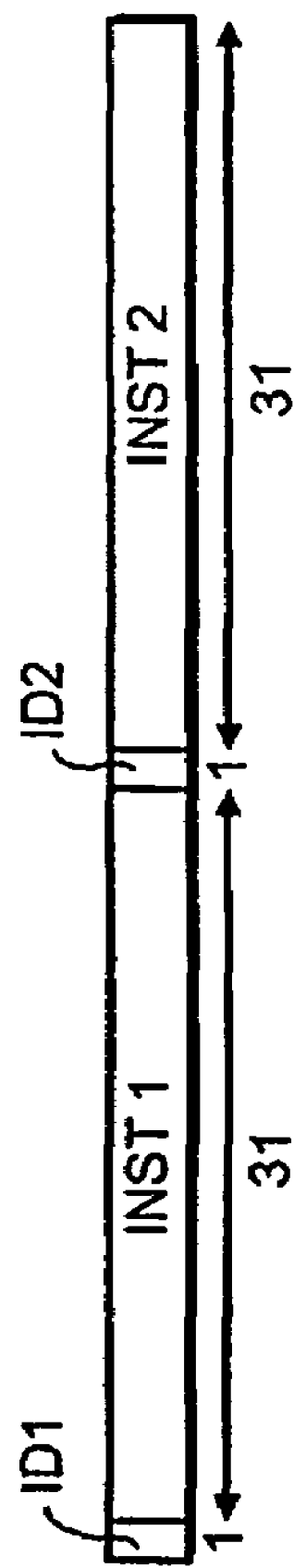

MICROPROCESSOR WITH HIGH SPEED MEMORY INTEGRATED IN LOAD/STORE UNIT TO EFFICIENTLY PERFORM SCATTER AND GATHER OPERATIONS

FIELD OF THE INVENTION

The present invention relates to the field of (micro) computer design and architecture, and in particular to microarchitecture associated with moving data values between a (micro)processor and memory components. Particularly, the present invention relates to a computer system and to a method for operating said computer system with an processor architecture in which register addresses are generated with more than one execution channel controlled by one central processing unit.

BACKGROUND OF THE INVENTION

Known computer designs usually have a direct connection between the processor and its memory components. In conventional designs data values are exchanged between the processor and the memory components containing load/store addresses and load/store data objects going in and out of the processor. In more sophisticated designs additional to the data values instruction addresses and instruction data objects are going out of the output side of the processor. With the improvement of the processor performance, and the enlargement of the memory components, the speed of data transfer between the processor and the memory components constitutes a bottleneck of the system performance and therefore, a so called cache memory was introduced into the design in addition to the main memory. A cache is a small fast memory component holding data recently accessed by the processor, and designed to speed up subsequent access to the same data. A cache is most often applied to processor-memory access but also used for a local copy of data accessible over a network.

The cache may be located on the same integrated circuit as the processor, in order to shorten the transmission distance and thereby further reduce the access time. The cache is built from faster memory chips than a main memory so that a cache hit takes much less time to complete than a normal memory access. Processor microarchitecture in this area has been developed gradually and led to so called System on Chip designs, wherein the cache is on the same silicon die as the processor. In this case it is often known as primary cache, since there may be a larger, slower secondary or third cache outside the CPU chip. As the processor's performance is getting faster, multiple levels of caching have been introduced, i.e. Level 1 being the closest to the processor, with Level 2 and sometimes Level 3 caches all on the same die. These different caches are usually of different sizes e.g. 16 kBytes for Level 1, 256 kByte for Level 2, 1 MByte for Level 3 so as to allow the smaller caches to run faster.

In computer systems it is conventional to define in each instruction to be executed a set of register addresses which are used to access a register file in the computer system. The register addresses usually include first and second register addresses defining registers from which operands are extracted and at least one destination register address defining a register into which the results of an operation are loaded. Data processing instructions generally use the contents of the first and second registers in some defined mathematical or logical manipulation and load the results of that manipulation into the defined destination register. Memory access instructions use the register addresses to define memory locations for loading and storing data to and from a data memory. In a load instruction, source registers define a memory location from which data is to be loaded into the destination register. In a store instruction, the source registers define a memory location into which data is to be stored from the destination register.

Existing computer systems generally operate by generating memory addresses for accessing memory sequentially. The architecture of existing computer systems is arranged such that each memory access instruction defines a single memory address. Memory access units exist which allow two addresses to be generated from a single instruction, by automatically incrementing the address defined in the instruction by a certain predetermined amount. However, these systems are clearly restricted in that, if two addresses are generated, the second address necessarily bears a certain predetermined relationship to the first address. Vector stride units also exist which allow more than one memory address to be computed, but these are also limited in the relationship between the addresses. Moreover, it is necessary to generate the first address prior to calculating the second address, and therefore it is not possible to generate two memory access addresses simultaneously in a single memory access unit.

In some known computer systems a permuter is used for picking up data that is in columnar organisation and transforming it into a row organisation. A permuter is a device for reordering data in a large data structure. In most conventional computer systems the permuter is used in a reasonable amount of the cycle count. However, a permuter operation has the disadvantage of slow performance, since it requires a long processing time. Known super computers usually perform scatter/gather operations by means of expensive memory systems. Scatter/gather operations have not yet been implemented into microprocessors, since they require extensive processing time, especially if it shall be performed efficiently. Furthermore, it is not an option to implement scatter/gather operations in microprocessor designs for cost reasons.

Some computer systems have more than one execution channel, e.g. dual ported computer systems with two execution channels. In such dual ported computer systems, each execution channel has a number of functional units which can operate independently, whereas both execution channels can be in use simultaneously. In some cases the execution channels share a common register file. It is useful in such architectures to provide instructions which simultaneously instruct both execution channels to implement a function so as to speed up operation of the processor. In such a scenario, a so-called long instruction may have two instruction portions each intended for a particular execution channel. Each instruction portion needs to define the register addresses for use in the function to be performed by the execution channel for which it is intended. In some cases both instruction portions may wish to define associated or the same register addresses. In these situations a long instruction needs to define two sets of register addresses, one for each execution channel.

In known (vector) computer architectures, the process of sending a set of values, e.g. v1, v2, v3, v4 . . . , to a related set of memory addresses, e.g. a, a+n, a+2n, a+3n . . . , is called "scatter", whereas the process of fetching a set of values is called "gather". In a packed single instruction multiple data (SIMD) format, the instructions provide scatter operations, e.g. store vector byte STVB, store vector for half word instructions STVH, store vector for word instructions STVW and gather operations, e.g. load vector byte LDVB, load vector for half word instructions LDVH, load vector for word instructions LDVW, which transfer data between the register packed format and a set of scalar values in memory addresses. STVW stores word 0 of the source in the base address and word 1 of the source in the base address plus offset. LDVH fetches half word 0 of the destination from the base address, half word 1 for the base address plus offset, half word 2 from the base address plus 2*offset, half word 3 from the base address plus 3*offset. However, the LDV and STV operations are limited to a single 64 bit packed SIMD value.

To achieve a high performance of a (vector) computer system it is desirable to do scatter and gather operations efficiently, even though the operation implies multiple data transfers between the processor and memory. It is an object of the present invention to provide more efficient methods for picking up data that is in columnar organisation and transforming it into a row organisation. Particularly super computers have the problem to handle complex data structures, especially when data is in the wrong organisation. More specifically, it is an object of the present invention to provide a method to gather a data structure in an organisation of A0, A1, A2, A3, A4, into an organisation of A0, A8, A16, A24 in one operation.

Recently dual ported processors have been developed with specific designs comprising two execution channels or pipelines and two load/store units (LSU) capable of two load/store data transactions per cycle (e.g. Broadcom "Firepath" processor) which will be described in more detail further below. In existing systems such dual ported processors have been connected directly to a psuedo dual ported on chip memory of a small size, e.g. 192–256 kbyte, to react fast enough. Since processors comprising two execution pipelines capable of two load/store data transactions per cycle run faster than conventional processors and the amount of required memory is increased, problems occur in implementing data caches to such processor designs.

Another object of the present invention is to overcome the above mentioned problems and disadvantages by providing a processor architecture for dual ported processor implementations with two execution pipelines capable of two load/store data transactions per cycle and managing the data transactions between the processor and its cache memory. Still another object of the present invention is to provide increased flexibility for memory accesses in such dual ported processor implementations comprising two execution pipelines capable of two load/store data transactions per cycle.

SUMMARY OF THE INVENTION

The above objects are attained by a computer system comprising a processor with at least one load/store unit for loading and storing data objects, a decode unit for decoding instructions supplied to the decode unit from a program memory, wherein each instruction has at least one bit sequence defining a register address; a register file having a plurality of registers each having the same bit capacity and addressable via at least two register address ports, one of said ports being associated with a first execution channel of the computer system and the other of said ports being associated with a second execution channel of the computer system; a first register address supply path for supplying said at least one bit sequence to said one register address port; and at least one cache memory associated with the processor holding data objects accessed by the processor; said processor's load/store unit containing a high speed memory directly interfacing said load/store unit to the cache and directly accessible by the cache memory for implementing scatter and gather operations.

The principle approach of the present invention is to use of load/store units of the processor which are modified to include a high speed memory which can be directly accessed by the cache memory for implementing scatter and gather operations. The present invention also proposes a SIMD gather and scatter parallel instruction implemented to use a specific structure of the load/store unit to perform the necessary data buffer. A single gather operation can not be implemented efficiently, since by its nature a single gather operation includes picking up all the required data objects in different instruction words. Nevertheless, a subsidiary gather can be can implemented efficiently. In case a gather operation shall be performed on data items A0, A8, A16, A24 than a subsequent gather operation can efficiently be performed on data items A1, A9, A17, A25, since the data information is already present in the load/store units of the processor. Beside a subsequent operation a parallel operation will also be performed efficiently, e.g. by LDVH r4,[a],#8:LDVH r5,[n],#8;b is a+2 in the dual long instruction word (LIW) operation where the two load/store pipelines are sharing the hotline cache. It is noted that the subsequent or parallel operations do not have to be to A1 where A0 has been referenced, but they can be to A2 or A3, since that information is held in the same hotline. And, since the hotlines are aligned to memory long words, the information could be fetched from A1 first and then fetched A0. For this sake, in a preferable embodiment of the present invention the structure of the load/store units is adapted to perform scatter and gather operations in a highly efficient manner.

A single gather operation can not be implemented efficiently, since by its nature a single gather operation includes picking up all the required data objects in different instruction words. Nevertheless, a subsidiary gather can be can implemented efficiently. In case a gather operation shall be performed on data items A0, A8, A16, A24 than a subsequent gather operation can efficiently be performed on data items A1, A9, A17, A25, since the data information is already present in the load/store units of the processor. For this sake, in a preferable embodiment of the present invention the structure of the load/store units are adapted to perform scatter and gather operations in a highly efficient manner.

On current packed SIMD data in a register machines, it is trivial in a 64 bits load operation to retrieve data items a0, a1, a2, a3, . . . held in sequential addresses and write them into a register as packed SIMD data, e.g. LDL r0,[a,#0]; load half word 0, 1, 2, 3, . . . The subject matter of the present invention refers to the is more complex operation to retrieve data items, e.g. a0, a13, a26, a39, . . . held in addresses that increase by some arbitrary (known only at run time) value into the register as packed SIMD data for the situation. Where the data is half words this can be done by the following opcodes:

LDH r0, [a, #0]
LDH r1, [a, #13]
LDH r2, [a, #26]
LDH r3, [a, #39]; load the 4 data items
ILVH1 r4, r0, r1; pack the first two together
ILVH1 r5, r2, r3; pack the second two together
ILVW1 r6, r4, r5; pack all four together The objective of LDVH r6, [a], #13 is loading data items into load/store units (LSU) and packing the data items to SIMD in a register without further programming. If in the next step data items you increment by one are requested, the next LDVH r n, [a], #13 will have the data cached in the load/store units (LSU) without any more memory requests.

The present invention can also be considered as an improved fundamental part of all possible architectures with dual ported microprocessor implementations comprising two execution pipelines capable of two load/store data transactions per cycle which need to support data caches. One principle of the present invention resides in the fact that instead of dealing with two separate transactions in the cache design of the processor, the processor's own load/store units (LSU) are modified to include a small piece of high speed memory ("hotlines") which can be accessed much faster than an external transaction to the load/store units of the data cache.

For a gather operation all 8 hotlines or up to 8 hotlines are used for the subsidiary data values and when a subsequent gather operation is issued, the addresses for the required data items can be generated in the structure of the load/store units. If, for instance data items A0, A8, A16, A24 are requested in a gather operation A0, A8, A16, A24 is written into the high speed memory ("hotlines") of the load/store units and stored there. Then the next scatter operation which writes A1, A9, A17 and A25 merges the data in the hotlines of the load/store units. Only when new empty hotlines are needed, the content of that hotline is written back into memory.

In other words, if data objects A0, A8, A16 and A24 are required in a current operation, then it is quite likely that in the next operation data objects A1, A9, A17 and A25 are required. Therefore, the data A1, A9, A17 and A25 are already put into the high speed memory ("hotline") of the load/store unit. Hence, according to the present invention with the hotline implementation in the load/store unit the necessary data is already stored in the hotlines and a gather operation can be performed as quickly as in an ordinary single load or store, because information that is held locally in a hotline is essentially transferred in a row format or a column format in the hotlines is transformed into a row format in the register immediately. Thus, it is possible to execute gather instructions that operate the same way as load instruction, provided the required data is in the hotline. Only in case the data object is not in the hotline, it has to be fetched from the memory. For this sake, the hotline that does not contain the right data information fetches the required information. The gather instruction generates all necessary addresses and any hotlines that do not contain the right data information fetches the required information. Thus, scatter/gather operations in the above described manner are specific new instructions.

The present invention uses a high speed memory structure ("hotlines") in the load/store unit in order to reduce the number of data transfers and to accelerate data transfers, respectively. By ensuring that there are enough hotline entries in the load/store unit (at least 8 memory items are needed to cope with LDVB), an LDV may be able to reuse data fetched for a previous LDV and an STV can write all its data into the hotlines. For LDV, the hotlines are inspected to ensure that 8 different memory items are present and the required 64 bit packed SIMD value is assembled from those lines. This requires the hotline reads to either be able to handle 8 simultaneous accesses or the values to be partitioned. The required values may be in the same hotline, e.g. LDVB R0, which reads a packed 64 bit SIMD set of 8 bytes from every other byte, the number of the required hotlines depending on the alignment of the base address.

For STV the hotlines function in a similar manner, but the nature of the hotline management needs to be upgraded from 'write through' behaviour to 'write back' behaviour in order to provide the performance gain in the operation of merging subsequent STV transactions. The computer system according to the present invention provides the benefit of efficiency gains for LDV/STV by reusing the data information which already present in the hotline structure of the load/store unit.

In contrast to the computer system according to the present invention, conventional (vector) supercomputers are usually equipped with a memory as fast as the processor and concerned about performance on wide objects, e.g. 32 bit floating point values. Such known computer systems are only provided with a conventional read buffer and write buffer. Furthermore, the possibility of converting between arrays of scalars and packed SIMD objects is missing from many instruction sets in conventional computer systems. In known computer architectures the processors only include read buffers or write buffers between the load/store unit and cache, and the processors are not directly interfaced from their load/store units to the caches. In most conventional processors the read/write buffers are placed outside the cache. Traditionally, the write buffer is used to hold a line which is being evicted from a write-back data cache while the new data is being read (first) into that line. Access to an external data cache is such a time critical process that unwanted delays caused by external data cache accesses are to be avoided.

By including read buffers or write buffers inside the load/store unit according to the present invention, the processors are directly interfaced from their load/store units to the caches. Thus, the present invention provides a computer system which is able to manage the data transactions between the processor and its cache memory substantially faster than known devices and methods for managing the interaction between processors and their data cache. A processor architecture according to the present invention deals with the two transactions per cycle from two load/store units of dual ported processor designs without making the data cache any more complicated. The operation LDVB causes 8 memory transactions per execution channel of the dual ported computer system, and if it misses the hotlines, the load/store unit design according to the present invention makes these transactions sequential.

BRIEF DESCRIPTION OF THE DRAWINGS

For a better understanding of the present invention and to show how the same may be carried into effect, reference will now be made by way of example to the accompanying drawings in which:

FIG. 2 is a diagram illustrating the encoding of two "packed" instructions.

DESCRIPTION OF THE PREFERRED EMBODIMENTS

Figure 1:
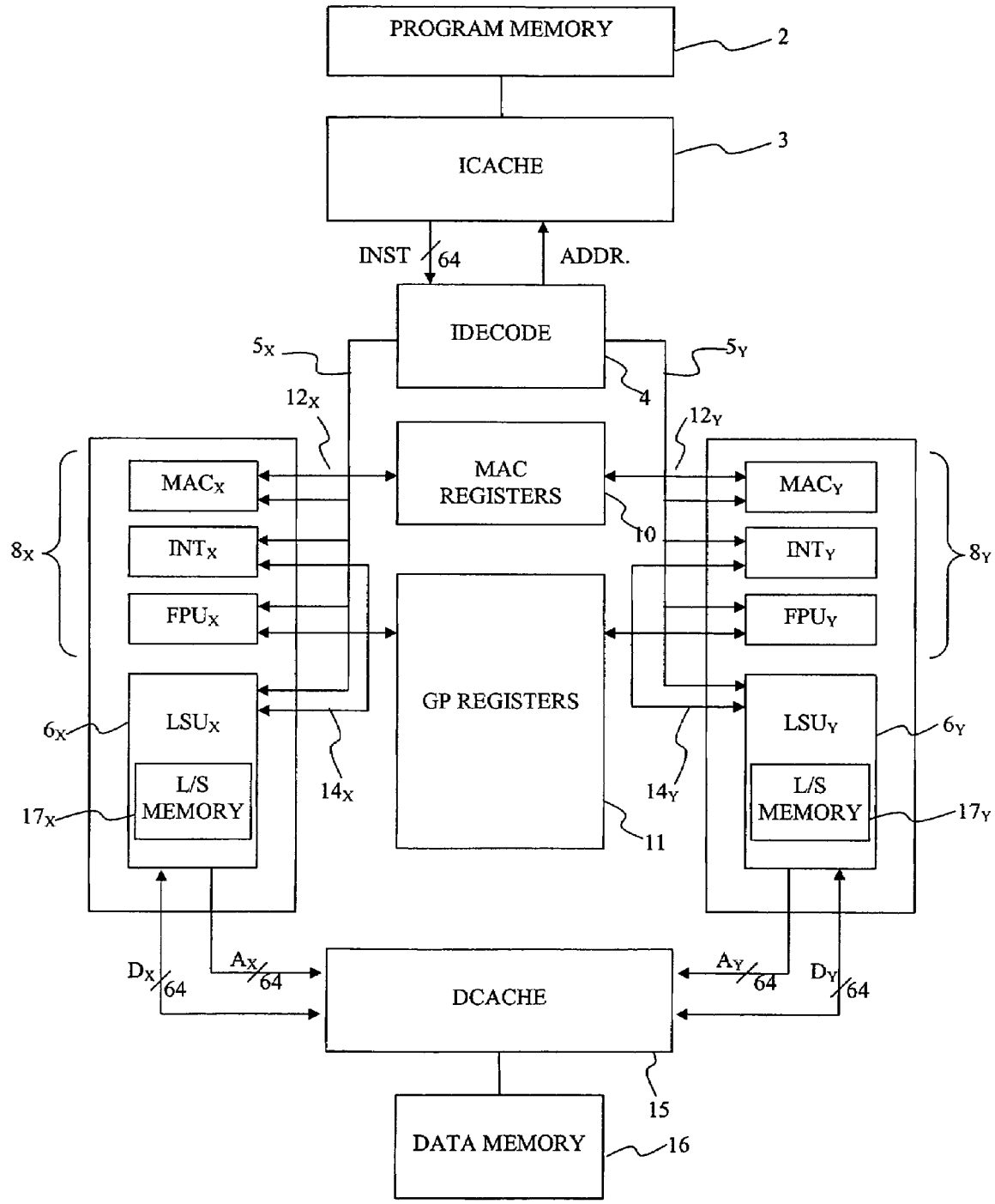
FIG. 1 is a schematic block diagram illustrating a dual ported processor.

Before describing a particular implementation of the present invention first the principle function of a known register access system will be discussed. The preferred computer system described herein is a dual instruction stream, multiple data (DIMD) stream machine which normally executes two "instructions" every cycle. FIG. 1 is a schematic diagram of a system capable of performing the present invention. In FIG. 1, reference numeral 2 denotes a program memory which holds programs in the form of a plurality of instructions. In the normal mode of operation, each 64 bit instruction in the program memory allows two 31 bit operations to be defined in the manner illustrated in FIG. 2. That is, each 64 bit instruction contains two 31 bit instruction portions labelled INST1 and INST2. Each instruction portion has associated with it a single bit which identifies the type of instruction. These are denoted ID1 and ID2 in FIG. 2, standing for identification bits. An instruction portion can identify a data processing (DP) operation or a load/store (LD/ST) operation. The allowed combinations are two data processing operations (ID1,1D2 both set to "0"), two load/store operations (ID1,1D2 both set to "1") or one data processing and one load store operation (ID1=0, ID2=1).

Reverting to FIG. 1, the program memory 2 is connected as instruction cache 3 which is connected to instruction fetch/decode circuitry 4. The fetch/decode circuitry issues addresses to the program memory and receives 64 bit lines from the program memory 2 (or cache 3), evaluates the opcode and transmits the respective instructions INST1, INST2 along X and Y channels $5_X$, $5_Y$. Each channel comprises a SIMD (single instruction multiple data) execution unit $8_X$, $8_Y$ which includes three data processing units, MAC, INT and FPU and a load/store unit LSU 6. Each data processing unit MAC, INT and FPU and the load/store units LSU operate on a single instruction multiple data (SIMD) principle according to the SIMD lane expressed in the instruction according to the following protocol which defines the degree of packing of objects for packed data processing operations:

(B)—8 bit objects ($b_0 \ldots b_7$)
(H)—16 bit objects ($h_0 \ldots h_3$)
(W)—32 bit objects ($w_0 \ldots _1$)
(L)—64 bit objects (I)
(S)—32 bit floating point
(D)—64 bit floating point For each channel $5_X$, $5_Y$ if the instruction is a data processing instruction it is supplied to the appropriate data processing unit MAC, INT or FPU and if it is a load/store instruction it is supplied to the load/store unit LSU. Data values are loaded to and from the MAC data processing units into and out of a common register file 10 which includes sixteen 64 bit special purpose registers along register access paths $12_X$, $12_Y$. Data values are loaded to and from the INT and FPU data processing units and the load/store units LSU into and out of a second register file 11 which includes sixty-four 64-bit general purpose registers. Register access paths $14_W$, $14_Y$ are provided for these accesses. The program counter PC which indicates the current instruction can be read via one of the general purpose registers. Another one of the general purpose registers constitutes a control and status register.

Each register access path 12, 14 carries three addresses from the accessing unit, two source addresses SRC1, SRC2 and a destination address DST. In the case of data processing instructions, the source addresses SRC1, SRC2 define registers in the register files 10, 11 which hold source operands for processing by the data processing unit. The destination address DST identifies a destination register into which a result of data processing will be placed. The operands and results are conveyed between the register file 10 or 11 and the respective data processing unit via the access paths 12, 14. In the case of load/store instructions, the instruction formats allow memory access addresses $A_X$, $A_Y$ to be formulated from data values held in the registers as described later. The load store units access a common address space in the form of a data memory 16 via a dual ported data cache DCACHE 15. For this purpose, each load/store unit has a 64 bit data bus $D_X$, $D_Y$ and a 64 bit address bus $A_X$, $A_Y$. Each load/store unit $6_X$, $6_Y$ can execute a number of different memory access (load/store) instructions.

According to a first class of memory access instructions, an object is loaded into a destination register specified in the instruction (in the DST field) from an address read from a source register in the instruction (in the BASE REG field). The length of the object depends on the SIMD lane B,H,W or L specified in the instruction opcode. If the object length is less than 64 bits, the upper bits of the destination register are filled with zeros. This class of instruction also allows the number of objects to be specified. The memory address is read from the source register in the register file 11 by the specified load/store unit $6_X$, $6_Y$ and despatched to the cache 15 via the appropriate address bus $A_X$, $A_Y$. The object or objects are returned along the data bus $D_X$ or $D_Y$ and loaded into the destination register of the register file 10 by the load/store unit.

For each of the load instructions in the first class, there are matching store instructions. In each case, a single address is sent by each load/store unit and a single data value is returned at that address. That data value can constitute a number of objects depending on the number specified in the instruction and the length specified in the SIMD lane of the instruction.

The processor described herein additionally provides a class of instructions which use packed offsets with a single base register in order to compute two (or more) addresses from a single instruction and therefore allow two (or more) data values to be retrieved from memory from one 32 bit instruction. The destination register (which serves as a source register for store operations) specifies an even/odd pair of registers for the memory access. By way of example, one instruction in this class, LDL2, will be described.

The load instruction LDL2 allows two long words to be loaded into successive destination registers $r_b$, $r_b+1$ from two independent addresses ADDR1,ADDR2 derived from a base address held in a register $r_a$ identified in the BASE REG field and two packed offsets w0,w1 held in a register $r_c$ identified in the INDX REG field. The LDL2 instruction thus allows two independent addresses to be generated. The INDX OP field allows the degree of packing (SIMD lane) in the index register $r_c$ to be defined.

It is now understood that the above described computer device is capable of running instructions on two identical pipelines in form of parallel instructions with the register fields modified, i.e. using special instructions which enable the device to co-execute instructions. Such parallel instruction is represented at assembly language level by the mnemonic with a 2 added, e.g. if LDL is load long, then LDL2 is load long dualled and loads two longs using two load store pipelines where the register addressing is modified on the second pipeline. This prior method, which this invention extends upon, designated a few special instructions (LDL2, STL2) which caused instructions co-executing with them to become dual executed instructions. Thereby, the possibility is provided for the programmer to explicitly specify said parallel operation without using more register space.

The present invention provides an improved performance for dual ported microprocessor implementations comprising two execution pipelines capable of two load/store data transactions per cycle which need to support data caches. The principle of the present invention resides in the fact that instead of dealing with two separate transactions in the cache design of the processor, the processor's own load/ store units (LSU) are modified to include a small piece of high speed memory ("hotlines") which can be accessed much faster than an external transaction to the load/store units of the data cache, and which is directly accessible by the cache memory for implementing scatter and gather operations.

In a preferred embodiment of the present invention, the dual ported processor's load/store units contain eight 256 bit lines of memory in common between the two of them plus the address this memory refers to ("hotlines"). In another preferred embodiment of the present invention provides a specific hotline for a data transfer between the dual ported processors' load/store units and the caches can be used to read or write simultaneously (true dual ported) by each load/store unit in just one phase of the respective load/store unit execution pipeline.

According to another aspect of the present invention the high speed memory of the load/store unit is physically migrated inside of the processor's execution pipeline. In a preferred embodiment of the device according to the present invention the high speed memory of the load/store unit is arranged right inside the processor's load/store execution pipelines. Such the high speed memory arranged inside the processor's load/store execution pipelines acts like hotlines with very high performance, since these are the lines the processor most frequently accesses in the level of data cache.

Usually caches are slow to access, since the processor needs to find out where in the cache the required data is stored. This can be done by checking one or multiple tags to determine which way of the cache the data was stored. Preferably 8 addresses are compared simultaneously, not sequentially. There's only one comparison time in total after which it can be determined which hotline matched the address. In case the hotline does not match with the address of the external cache has to be accessed again. Only one hotline will match for simple accesses like LDB, but many may match for LDVB above. In case one hotline address does match with the address of the external cache, the values of said address are applied onto the read data bus of the computer system. With the high speed memory migrated inside of the processor's execution pipeline according to one embodiment of the present invention an associative match can directly be done on the address by comparing eight addresses. After eight comparisons have been performed the required address is determined and the requested data can be retrieved from the registers with the respective address.

Conventionally, in a processor a load/store unit having several execution pipeline stages is provided. In this pipeline stages addresses are formed and caches are controlled. In processors comprising two execution pipelines and two load/store units, two addresses were formed in different load/store execution pipelines may be identical. If the same address has been formed in both execution pipelines, the processor is not really dual ported, and both execution pipelines would access the same block of memory. For avoiding data collision the accesses are sequentialized by sending an address out to the memory, waiting a cycle, retrieving the requested data and aligning the data.

The hotlines according to the present invention also provide the implementation method for strided memory read and write operations—converting between a sequence of addresses in memory and a packed SIMD value in registers. Hence, the 8 values in order for an instruction like LDVB (load a strided vector of bytes) to work, storage for the data for each of the 8 bytes has to be provided in the 64 bit packed object that results. For instance, the instruction LDVB R0, [R1,#stride] requires the processor to generate the 8 byte address R1, R1+stride, R1+stride*2 . . . R1+stride*7 and fetch the data from there—or the aligned 256 bits which contains those addresses—and assemble a single SIMD value containing those 8 byte values. The hotline array can also be used to store the 8 intermediate values so that a subsequent instruction LDVB R0, [R1,#stride] operation where R1 has increased, e.g. by 1, will need to generate fewer—in case of many alignments of the data even none—data requests and so execute more quickly. Similarly, STVB will write the values into the hotlines, merging with what is already in the hotlines.

Hence, with a high speed memory of the load/store unit arranged and migrated inside of the processor's execution pipeline according to the present invention the execution pipeline runs faster and the required address places can be retrieved more quickly. As a result, the required addresses are included in the load/store pipeline and thereby, the required addresses are immediately available for the processor omitting a necessity to check caches. Once a data access is formed a verification of an address match is performed.

In known dual ported computer systems it was not possible to perform two simultaneous random data accesses with addresses directed to the same block of the memory, respectively. Known dual ported computer systems can only do two simultaneous accesses in the case where the required addresses do not resolve in the same block of the memory. According to the present invention with a high speed memory arranged and migrated inside of the processor's execution pipeline it is not necessary anymore to sequentialize memory accesses, since the high speed memory of the load/store unit is designed for a dual port reading, which makes it possible to perform two simultaneous random accesses with addresses directed to the same block inside the memory, respectively. Since the design of a high speed memory in the load/store unit according to the present invention is of a small structure and of low complexity the additional costs for making it dual ported are irrelevant. In contrast to this, the costs of making an ordinary cache for a truly dual ported memory are much higher.

Still another benefit of the processor architecture according to the present invention with a high speed memory migrated inside of the processor's execution pipeline a load/store execution pipeline is provided that has an enhanced in/out interface to the outside of the processor, which can tolerate the outside environment being slower. Thereby, a natural wider interface to the processor and a higher bandwidth situation can be achieved.

The migration of a high speed memory inside of the processor's execution pipeline causes LDV/STV operations to be influenced by the general changes in LDL2 support. As a first reason, dual ported processors support dualling of arbitrary data size load/store operations rather than just LDL. There are certain differences between an old LDL2 and the new LD2[B|H|W|L], however, they basically operate in the same way. The new LD2B, LD2H, LD2W, LD2L generate addresses as normal on the original execution side and add 1, 2, 4 and 8 to the address offset on the other execution side (i.e. similar to LDL2 ra/rb, [base, #offset]). This may be extended to LDV2[B|H|W] or the stride multiplied by 8 (B), 4 (H), 2 (W). The major change resides in dualling register offset items. Previously impossible, the new machines can execute LD2W r4/r5, [base, offset a/offset b], forming the address base+offset a to fetch r4 and base+offset b to fetch r5 where these values are in different registers. This also applies to LDV2/STV2.

Especially for high utilisation on dual ported computer systems with two execution channels or pipelines X and Y, it is desirable for an operation to fit into the constraints of LDL2/STL2. Therefore, the code must be separately executable on both execution pipelines of the dual ported computer system and must only use one address register. In order for the X execution pipeline to run half of the operation, it must be able to compute where to start without reference to the information on the Y execution pipeline. It is also necessary to devise an addressing format that works for bytes, half words and words and could be extended for long word operations if required.

In a simple format a word stride value is combined with a word base address. Both execution pipelines X and Y read this word stride value, and the X execution pipeline adds the stride multiplied by the number of units before addressing any memory. Positive and negative strides can be supported and by supporting just the word size for stride values without the need to scale it. By not requiring any additional use of the immediate field in the LDL2/STL2 format for addressing, the complexity of generating the first address is kept to a minimum. Additionally, by being able to make use of the immediate field, the number of operations required can be dealt with in limited encoding space.

To create dual gather-halves, e.g. the Y execution pipeline side starts at a certain address, and the X execution pipeline side starts at said address plus stride times 4. Each execution pipeline side loads the half word at the address into the half word byte number 0 of the execution pipeline side's gather temporary register and then adds the stride to the address to create the next address to be loaded into half word byte number 1. This procedure is repeated until all halves are done. Then the temporary register is sent to the register specified in the original operation. As an option it is possible to provide a write back option, where the next address generated while doing the last unit is combined with the stride and written back to the address register.

In these sketches several particularities have to be considered. For instance, it is impossible to issue a subsequent scatter operation until the first preceding has stopped using the latch holding the source data. Furthermore, a subsequent gather operation can not be issued until the gather temporary register has been filled and sent to the register bank. At a higher level, the implicit cracking of the operations may ultimately increase the interrupt latency, and the gather temporary register increases the context change time, since a scoreboard lock will be held on a real register which can not be saved. The implicit cracking leaves the data reuse problem unsolved, since there are real memory read/write operations for every datum even if a related memory read/write operation has occurred.

To achieve these objects data structures inside the load/store unit are required. A scatter write buffer or cache can store all the information in a scatter operation, allowing the next scatter operation to start next cycle. Furthermore, a scatter write buffer or cache can merge a plurality of scatter operations together in order to reduce the rate of data transmission. A gather read buffer or cache can perform in a similar manner. In both cases the operation will not be cracked by prime load/store unit and just passed.

A sketch of a scatter write buffer contains 8 long data items per side of the instruction, each with an implicit long address. Alternatively, it is also possible to store the actual address; however, the actual address can be easily derived form the base address and stride information of the previous scatter operation and a byte in use bit per data item. As a scatter enters the buffer, a comparison is performed for coherence with the previous scatter. For this operation an address, stride and unit size check is required. If the result of this comparison is coherent, then it is merged with the data in the scatter write buffer. If the result of the check is not coherent, then the current buffer is written out. As an option the scatter write buffer can deliver its output into a conventional write buffer.

A sketch of a gather read buffer contains 8 long data items per side of the instruction. When a gather operation is required, the address and stride are checked for coherence with the data in the gather read buffer. If the result of this comparison is coherent, then the required long data item is assembled from the buffer and returned. If it doesn't match, then 8 long data items are read from the memory using the new address and stride, and the required long data item is assembled.

With scatter write buffer and gather read buffer, the computer system is mostly able to sustain continuously issued scatters or gathers. Thereby, the computer system can be programmed to provide enough control and to ensure that optimum performance is maintained. Possible Opcodes are: LDVB, LDVH, LDVW, STVB, STVH, STVW and LDV2B, LDV2H, LDV2W, STV2B, STV2H, STV2W.

What is claimed is:

1. A computer system comprising:
   a memory to store a program having a plurality of instructions, wherein at least one instruction implements a gather operation and at least one instruction implements a scatter operation;
   a decode unit for decoding instructions supplied to the decode unit from the memory, said decode unit issues an address to said memory and receives an instruction from said memory, said decode unit transmits a first instruction portion along a first execution channel of the computer system and a second instruction portion along a second execution channel, wherein each execution channel containing at least one processing unit and at least one load/store unit;
   a register file having a plurality of registers each having the same bit capacity and addressable via at least two register address ports, one of said at least two ports being associated with said first execution channel of the computer system and the other of said at least two ports being associated with said second execution channel of the computer system;
   a register address supply path for supplying said processing units and said load/store units access to said register address ports; and
   at least one cache memory associated with the processor holding data objects accessed by the processor;
   wherein each of said load/store units contains memory adapted to be directly accessible for implementing scatter and gather operations, wherein said memory of at least one of said load/store units stores instant and subsidiary data values associated with said scatter and gather operations.

2. A computer system according to claim 1, wherein the load/store memory is adapted to efficiently perform said scatter and gather operations.

3. A computer system according to claim 1, wherein the load/store memory is implemented by read buffers or write buffers included inside the load/store unit of the processor.

4. A computer system according to claim 1, wherein the load/store memory is holding addresses of data objects required by the processor.

5. A computer system according to claim 1, wherein the load/store memory is physically migrated inside of the processor.

6. A computer system according to claim 1, wherein a plurality of load/store units of the processor are modified to include a load/store memory directly accessible by the cache memory for implementing scatter and gather operations.

7. A computer system according to claim 1, further comprising eight 256 bit lines of memory between the load/store unit of the first execution channel and the load/store unit of the second execution channel.

8. A computer system according to claim 1, wherein the load/store memory is designed for a dual port reading capable to perform two simultaneous random accesses with data addresses directed to the same block inside the cache memory.

9. A computer system according to claim 1, wherein the load/store memory provides an interface between the processor and an external cache memory.

10. A computer system according to claim 9, wherein said interface between the processor and said external cache memory is single ported and implemented in a system on a chip.

11. A computer system according to claim 1, wherein the processor carries out a comparison between the address of a required data object and an address held in the load/store memory.

12. A computer system according to claim 11, wherein the processor retrieves a required data object from the load/store memory, if the address of the required data object and the address held in the load/store memory matches.

* * * * *